(12) United States Patent
Kashiwase

(10) Patent No.: US 6,461,262 B2
(45) Date of Patent: Oct. 8, 2002

(54) WORKING OIL FILTER DEVICE FOR CONTINUOUSLY VARIABLE TRANSMISSION

(75) Inventor: Hajime Kashiwase, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 59 days.

(21) Appl. No.: 09/778,796

(22) Filed: Feb. 8, 2001

(65) Prior Publication Data

US 2001/0024988 A1 Sep. 27, 2001

(30) Foreign Application Priority Data

| Feb. 8, 2000 | (JP) | 2000-029914 |
| Feb. 8, 2000 | (JP) | 2000-029915 |
| Feb. 8, 2000 | (JP) | 2000-029916 |

(51) Int. Cl.$^7$ ........................... F16H 59/00; F16H 61/00
(52) U.S. Cl. ........................................ 474/28; 474/18
(58) Field of Search ................... 474/28, 18; 475/210, 475/41, 46, 77; 477/39, 45, 69

(56) References Cited

U.S. PATENT DOCUMENTS

| 3,600,106 A | * | 8/1971 | Baits et al. ................... 475/77 |
| 3,705,642 A | * | 12/1972 | Thompson ..................... 477/69 |
| 4,478,105 A | * | 10/1984 | Yamamuro et al. ........... 477/45 |
| 4,672,864 A | * | 6/1987 | Morimoto ...................... 474/28 |
| 5,383,812 A | * | 1/1995 | Tibbles ......................... 474/28 |
| 6,350,215 B1 | * | 2/2002 | Gierling ....................... 475/159 |

FOREIGN PATENT DOCUMENTS

| DE | 39 33 794 A1 | | 4/1991 |
| DE | 10044177 C1 | * | 1/2002 |
| EP | 0 421 241 A3 | | 4/1991 |
| EP | 0 421 241 A2 | | 4/1991 |
| JP | 59-155647 | | 9/1984 |
| JP | 11-63175 | | 3/1999 |

* cited by examiner

Primary Examiner—David A. Bucci
Assistant Examiner—Marcus Charles
(74) Attorney, Agent, or Firm—Smith, Gambrell & Russell, LLP

(57) ABSTRACT

A working oil filter device for a continuously variable transmission including a primary pulley and a secondary pulley, between which a belt is made to run. The filter device comprises: a secondary pressure adjust valve for adjusting the pulley groove width thereof; a clutch pressure adjust valve for adjusting the clutch pressure; and a filter for filtering the working oil. The device can comprise a primary pressure adjust valve is provided, in place of the clutch pressure adjust valve. Further, The device can comprise a lubrication pressure adjust valve and a bypass oil passage for returning a drain oil.

10 Claims, 9 Drawing Sheets

WORKING OIL FILTER DEVICE FOR CONTINUOUSLY VARIABLE TRANSMISSION

BACKGROUND OF THE INVENTION

1. Field of the Invention

The present invention relates to a working oil filter device for a continuously variable transmission, for clearing the working oil circulating in the hydraulic circuit of the continuously variable transmission, of foreign substances and impurities.

2. Description of the Related Art

In a belt type continuously variable transmission (CVT) for an automobile, a drive belt made of a metal is made to run on a primary pulley mounted on a primary shaft on the drive side and having a variable pulley groove width and a secondary pulley mounted on a secondary shaft on a driven side or a follower side and having a variable pulley groove width, so that the speed of the secondary shaft may be continuously varied by varying the pulley diameters of the primary pulley and the secondary pulley hydraulically.

The speed change control of the CVT is made by controlling the oil pressures to the hydraulic cylinders disposed individually on the primary side and on the secondary side. The oil pressure to be applied to the second pulley is generated by an oil pump driven by the engine, and the secondary pressure to be applied to the hydraulic cylinder on the secondary side is reduced to adjust the primary pressure to be applied to the hydraulic cylinder on the primary side.

In order to transmit the output of the engine to the primary shaft, there is interposed between the primary shaft and the secondary shaft a forward/reverse change-over mechanism including: a forward clutch for transmitting the rotation of the crankshaft in a forward direction to the primary shaft; and a reverse brake for transmitting the same in the reverse direction. These forward clutch and reverse brake are fed with the working oil from an oil pump. In a CVT including a torque converter having a lockup clutch, on the other hand, a lockup apply chamber and a lockup release chamber are individually fed with the working oil. Moreover, the sliding portions of the CVT such as bearings or clutch facings are fed with the working oil for lubricating and cooling them so as to reduce the frictional forces and prevent the seizures.

Thus, the working oil, as discharged from the oil pump driven by the engine, is fed via the hydraulic circuit to the hydraulic cylinder for varying the pulley groove width, the clutch and the brake actuating hydraulic cylinder of the forward/reverse change-over mechanism, the individual oil chambers on the apply side and on the release side of the torque converter, and the lubricated portions. The working oil circulates between the aforementioned various oil pressure fed portions and the oil pump.

At the time of assembling the CVT, foreign substances such as cutting chips may migrate into the working oil, and worn powder may be produced at the working time of valves or from the sliding portions such as the bearings. The foreign substances or worn powder may migrate as contaminants or impurities into the working oil. With the working oil being thus contaminated, the frictional resistance is applied to the sliding portions of the valves for adjusting the oil pressure not only to become detrimental to the precise actions of the valves but also to have the valves stuck. The sliding portions may fail to be sufficiently fed with the lubricating oil thereby to lower the function of the CVT.

In order to prevent the foreign substance returned to the oil pan via the oil passage from entering the intake port of the oil pump, therefore, this oil pump is provided at its intake port with an oil strainer. If this strainer is given a fine mesh, however, a cavitation may occur in the pump when the oil has a high viscosity at a low temperature or when the speed of the oil pump is high. In order to reduce the mechanical loss of the oil pump, the intake resistance has to be lowered. Thus, the oil strainer is limited in the enhancement in the eliminating or trapping efficiency of the foreign substances.

In order to trap the foreign substances existing in the hydraulic circuit, it has been tried to assemble the oil filter in the coil passage, as disclosed in Examined Published Japanese Patent Application No. Hei. 4-69303. However, the filter assembled in the oil passage cannot be replaced, but its area has to be reduced. For the necessity for preventing the blinding of the filter, the filter is limited in its trapping efficiency so that what can be filtered out is the foreign substances of a relatively large size. If the trapping efficiency of the filter is to be improved, on the other hand, the flow resistance rises to invite the drop in the pressure or in the flow rate.

In order to trap such fine foreign obstacles as cannot be trapped by the oil strainer, it has been tried to connect a filter in series with an oil cooler, as disclosed in Unexamined Published Japanese Patent Application No. Hei 11-63175. When the working oil having been filtrated by the filter is returned to an oil pan, however, it may flow in the hydraulic circuit while entraining the fine foreign substances in the oil pan, so that the filter does not perform its function sufficiently.

Even if the ATF filter is arranged in series with the oil cooler and if the oil strainer is arranged at the intake port of the pump in the oil pan, what passes through the oil strainer is the working oil to be sucked from the oil pan by the oil pump so that what passes through the ATF filter is the working oil to flow the oil cooler. Therefore, the oil having failed to return to the oil pan circulates again in the hydraulic circuit, and the strainer may be unable to remove the foreign substances. On the other hand, the fine foreign substances, as cannot be trapped by the strainer, cannot be trapped so long as they pass through the ATF filter so that they pass through the strainer even if they return to the oil pan.

SUMMARY OF THE INVENTION

An object of the invention is to remove the foreign substances or impurities reliably from the working oil in the hydraulic circuit of a continuously variable transmission.

Another object of the invention is to keep and improve the reliability and durability of the continuously variable transmission while keeping the control performance of and preventing the reduction of the function of the continuously variable transmission.

According to a first embodiment of the invention, there is provided a working oil filter device for a continuously variable transmission including: a primary pulley mounting on a primary shaft and having a variable pulley groove width; a secondary pulley mounted on a secondary shaft having a variable pulley groove width such that a belt is made to run between said primary pulley and said secondary pulley; a forward clutch for transmitting the output of an engine in a forward direction to said primary shaft; and a reverse brake for transmitting the same in a reverse direction to said primary shaft. The filter device comprises: a secondary pressure adjust valve for adjusting and feeding the working oil, as discharged by an oil pump driven by said engine, to a secondary cylinder for varying the pulley groove width of said secondary pulley; a clutch pressure adjust valve disposed in a clutch pressure passage connecting the drain port of said secondary pressure adjust valve, said forward clutch and said reverse brake, for adjusting a clutch pressure from an original pressure or the drain pressure of said secondary pressure adjust valve; a lubrication pressure adjust valve disposed in a lubrication pressure passage connecting the drain port of said clutch pressure adjust valve and a lubricated portion, for adjusting a lubrication pressure with setting the drain pressure of said clutch pressure adjust valve to an original pressure; and a filter disposed on the upstream side of said clutch pressure passage.

According to a second embodiment of the invention, there is provided a working oil filter device for a continuously variable transmission including: a primary pulley mounting on a primary shaft and having a variable pulley groove width; a secondary pulley mounted on a secondary shaft having a variable pulley groove width such that a belt is made to run between said primary pulley and said secondary pulley; a forward clutch for transmitting the output of an engine in a forward direction to said primary shaft; and a reverse brake for transmitting the same in a reverse direction to said primary shaft. The filter device comprises: a primary pressure adjust valve for adjusting and feeding the working oil, as discharged by an oil pump driven by said engine, to a primary cylinder for varying the pulley groove width of said primary pulley; a secondary pressure adjust valve for adjusting and feeding the working oil, as discharged by said oil pump, to a secondary cylinder for varying the pulley groove width of said secondary pulley; and a filter disposed in a line pressure passage for guiding the discharge port of said oil pump, said primary pressure adjust valve and said secondary pressure adjust valve.

According to the first and second embodiments of the invention, the working oil filter device for the continuously variable transmission comprises: a check valve disposed in a bypass passage connecting the upstream side and the downstream side of said filter, for guiding the working oil to the downstream side when the oil pressure on the upstream side is higher than that on the downstream side by a predetermined value or higher.

According to a third embodiment of the invention, there is provided a working oil filter device for a continuously variable transmission including: a primary pulley mounting on a primary shaft and having a variable pulley groove width; a secondary pulley mounted on a secondary shaft having a variable pulley groove width such that a belt is made to run between said primary pulley and said secondary pulley; a forward clutch for transmitting the output of an engine in a forward direction to said primary shaft; and a reverse brake for transmitting the same in a reverse direction to said primary shaft. The filter device comprises: a secondary pressure adjust valve for adjusting and feeding the working oil, as discharged by an oil pump, to a secondary cylinder for varying the pulley groove width of said secondary pulley; a lubrication pressure adjust valve disposed in a lubrication pressure passage connecting the drain port of said secondary pressure adjust valve and a lubricated portion for adjusting a lubrication pressure with setting the drain pressure of said secondary pressure adjust valve to an original pressure; a filter disposed in a drain oil passage connecting the drain portion of said lubrication pressure adjust valve and the intake port of said oil pump; and a bypass passage for providing the communication between a bypass port disposed in said lubrication pressure adjust valve and adapted to be opened, when the amount of the working oil to be fed to said filter increases, and the downstream side of said filter.

According to another aspect of the third embodiment of the invention, there is provided a working oil filter device for a continuously variable transmission including: a primary pulley mounting on a primary shaft and having a variable pulley groove width; a secondary pulley mounted on a secondary shaft having a variable pulley groove width such that a belt is made to run between said primary pulley and said secondary pulley; a forward clutch for transmitting the output of an engine in a forward direction to said primary shaft; and a reverse brake for transmitting the same in a reverse direction to said primary shaft. The filter device comprises: a secondary pressure adjust valve for adjusting and feeding the working oil, as discharged by an oil pump, to a secondary cylinder for varying the pulley groove width of said secondary pulley; a lubrication pressure adjust valve disposed in a lubrication pressure passage connecting the drain port of said secondary pressure adjust valve and a lubricated portion for adjusting a lubrication pressure with setting the drain pressure of said secondary pressure adjust valve to an original pressure; a filter disposed in a drain oil passage connecting the drain portion of said lubrication pressure adjust valve and the intake port of said oil pump; and a drain pressure adjust valve disposed in a bypass passage connecting the upstream side and the downstream side of said filter, for opening said bypass oil passage when the amount of the working oil fed to said filter increases.

According to the first and third embodiments of the invention, in the working oil filter device for the continuously variable transmission, the filter is removably mounted on a casing covering a member constructing the continuously variable transmission.

According to the second embodiment of the invention, in the working oil filter device for the continuously variable transmission, the filter includes: a filter casing formed integrally with a casing covering members constructing the continuously variable transmission; and a filter element mounted removably in said filter casing.

DETAILED DESCRIPTION OF THE PREFERRED EMBODIMENT

A first embodiment of the invention will be described in detail with reference to the accompanying drawings.

Figure 1:
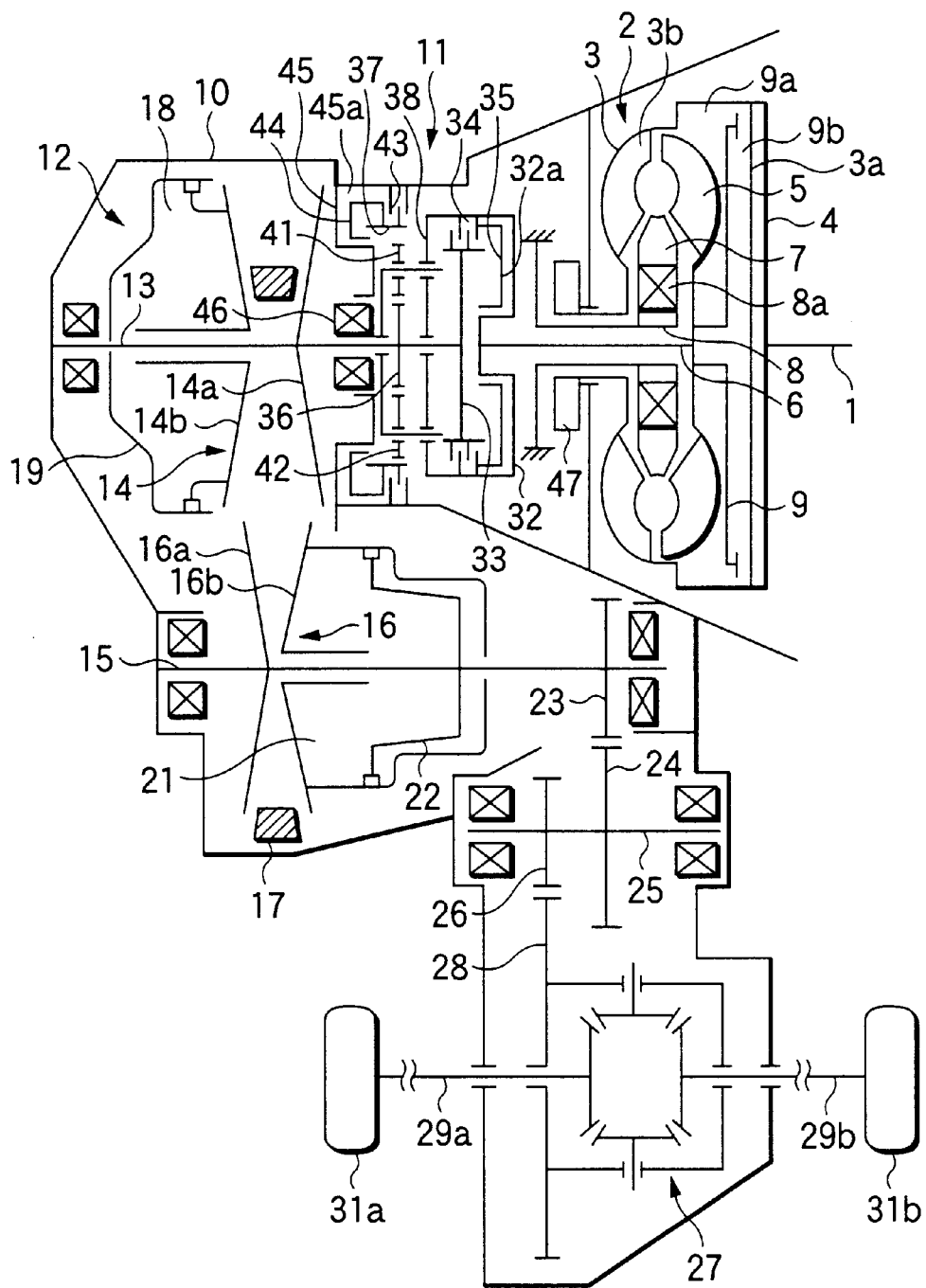
FIG. 1 is a schematic diagram showing one example of a drive system of a belt type continuously variable transmission.

FIG. 1 is a schematic diagram showing one example of a drive system of a belt type continuously variable transmission, i.e., a CVT. A crankshaft 1, as driven by the not-shown engine, is directly connected to a front cover 3a of a pump side casing 3 of a torque converter 2 through a drive plate 4, and a turbine runner 5, as arranged to confront a pump impeller 3b disposed in the pump side casing 3, is directly connected to a turbine shaft 6. Between the pump impeller 3b and the turbine runner 5, there is arranged a stator 7 which is supported by a one-way clutch 8 amounted on a stator supporting shaft 8. To the turbine shaft 6, there is directly connected a lockup clutch 9 which can move to an engagement position, in which it engages with the front cover 3a, and a release position in which it is disengaged. The power of the engine is transmitted through the torque converter 2 or the lockup clutch 9 to the turbine shaft 6.

The lockup clutch 9 is provided with a supply chamber or an apply chamber 9a on its one side and an open chamber or a release chamber 9b on its other side, so that the torque converter 2 is brought into an active state by circulating the oil pressure fed into the release chamber 9b, through the apply chamber 9a. By feeding the oil pressure to the apply chamber 9a to lower the oil pressure in the release chamber 9b, on the other hand, the lockup clutch 9 engages with the front cover 3a and comes into a lockup state. By adjusting the pressure in the release chamber 9b, there is made the slip pressure control in which the lockup clutch 9 is slid.

The turbine shaft 6 is connected through a forward/reverse change-over mechanism 11 to the input shaft or primary shaft 13 of a CVT 12. On the primary shaft 13, there is mounted a primary pulley 14 which is provided with a stationary pulley 14a fixed on the primary shaft 13 and a movable pulley 14b confronting the stationary pulley 14a and made axially movable with respect to the primary shaft 13 by a ball spline, so that the spacing between the cone faces of the pulleys, i.e., the pulley groove width can be made variable. On the output shaft arranged in parallel with the primary shaft 13, i.e., on a secondary shaft 15, there is mounted a secondary pulley 16 which is provided with a stationary pulley 16a fixed on the secondary shaft 15 and a movable pulley 16b confronting the stationary pulley 16a and made axially slidable like the movable pulley 14b with respect to the secondary shaft 15 so that the groove width of the pulleys can be made variable. Here, the drive system assembled as a whole in a casing 10 which is made of the transmission casing.

Between the primary pulley 14 and the secondary pulley 16, there is made to run a drive belt 17, the wound diameter ratio of which is varied with respect to the pulleys 14 and 16 by varying the groove widths of the pulleys 14 and 16 thereby to vary the speed of the secondary shaft 15 continuously.

In order to vary the groove width of the primary pulley 14, a cylinder 19 for forming a primary oil chamber 18 is mounted on the primary shaft 13 between the primary pulley 14 and the movable pulley 14b. In order to vary the groove width of the secondary pulley 16, a plunger 22 for forming a secondary oil chamber 21 is mounted on the secondary shaft 15 between the secondary pulley 16 and the movable pulley 16b, so that a cylinder on the secondary side is formed by the plunger 22.

The secondary shaft 15 is connected through gears 23 and 24 to an intermediate shaft 25. A gear 26, as mounted on the intermediate gear 25, meshes with a final gear 28 of a differential unit 27. Axles 29a and 29b, as connected to the differential unit 27, are provided with wheels 31a and 31b. These wheels 31a and 31b are front wheels in the case of a front wheel drive car.

The forward/reverse change-over mechanism 11 is provided with-a clutch cylinder 32, which is disposed at the forward clutch drum portion fixed on the turbine shaft 6, and a clutch hub 23 fixed on the primary shaft 13, and a multi-disc type forward clutch 34 is interposed between the clutch cylinder 32 and the clutch hub 33. In the clutch cylinder 32, there is assembled a hydraulic piston 35 for actuating the forward clutch 34. When the oil pressure is fed to a clutch oil chamber 32a in the clutch cylinder 32 to apply the forward clutch 34, the rotation of the turbine shaft 6 is transmitted through the clutch hub 33 to the primary shaft 13 so that the primary shaft 13 rotates in the same forward direction as that of the turbine shaft 6.

On the primary shaft 13, there is fixed a sun gear 36, around which a ring gear 37 is rotatably displayed in the casing 10. On a carrier 38 mounted on the forward clutch drum portion provided with the clutch cylinder 32, there are rotatably mounted a pair of planetary pinion gears 41 and 42 which mesh with each other. Of these, one planetary pinion gear 41 meshes with the sun gear 36, and the other planetary pinion gear 42 meshes with the internal teeth of the ring gear 37 so that they construct the double pinion type planetary gears. These planetary pinion gears 41 and 42 are shown separately one by one for presenting conveniences in FIG. 1 but are paired in plurality in meshing engagement.

Between the ring gear 37 and the casing 10, there is interposed a multi-disc type reverse brake 43, and a hydraulic piston 44 for actuating the reverse brake 43 is assembled in a brake cylinder 45 formed in the casing 10. With the forward clutch 34 being released, therefore, an oil chamber 45a in the brake cylinder 45 is fed with the oil pressure to apply the reverse brake 43. Then, the ring gear 37 is fixed in the casing 10. As the carrier 38 rotates with the turbine shaft 6, therefore, the sun gear 36 and the primary shaft 13 rotate backward of the turbine shaft 6 through the paired planetary pinion gears 41 and 42. The forward clutch 34 and the reverse brake 43 form the frictional engagement elements of the forward/reverse change-over mechanism 11.

In order to actuate a hydraulic actuated device such as the brake cylinder 45 or the clutch cylinder 32, there is arranged in the casing an oil pump 47 which acts as an oil pressure source. This oil pump 47 is driven through the crankshaft 1 via the pump side casing 3 by the engine.

Figure 2:
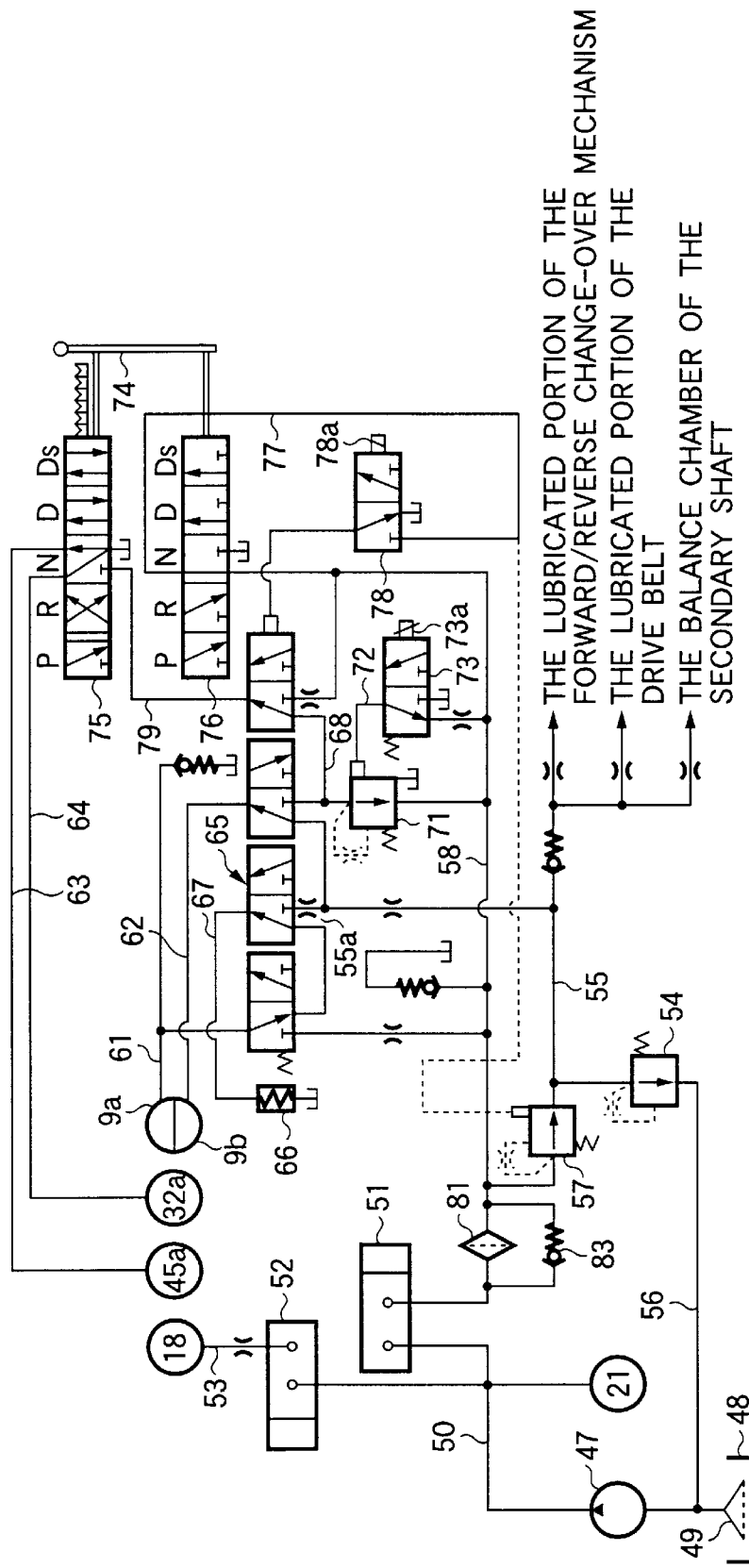
FIG. 2 is a circuit diagram showing a hydraulic circuit of the continuously variable transmission having a filter device according to a first embodiment of the invention.

FIG. 2 is a circuit diagram showing the hydraulic circuit of the CVT. The intake port of the oil pump 47 communicates with the oil pan 48 through an oil strainer 49 disposed in an oil pan 48, so that the working oil in the oil pan 48 flows through the oil strainer 49 into the intake port.

The discharge port of the oil pump 47 is connected via a secondary pressure passage or a line pressure passage 50 with not only the secondary oil chamber 21 for actuating the movable pulley 16b of the secondary pulley 16 but also a secondary pressure port of a secondary pressure adjust valve 51. By this secondary pressure adjust valve 51, the secondary pressure to be fed to the secondary oil chamber 21 is adjusted to a predetermined pressure so that it is controlled to a value matching the transmission capacity necessary for the drive belt 17. Specifically, the secondary pressure is raised to prevent the slippage of the drive belt 17, when the engine output is high for. an uphill or abrupt acceleration, but is lowered to reduce the loss of the oil pump 47 and improve the transmission efficiency when the engine output is low.

The line pressure passage 50 is connected with the input port of a primary pressure adjust valve 52, the output port of which is connected via a primary pressure passage 53 to the primary oil chamber 18 for actuating the movable pulley 14b of the primary pulley 14. By the primary pressure adjust valve 52, the primary pressure is adjusted to a value according to the target gear ratio or speed ratio so that the groove width of the primary pulley 14 is varied to control the vehicle speed.

To the drain port of the secondary pressure adjust valve 51, there is connected a clutch pressure passage 58, via which the working oil is fed to the clutch oil chamber 32a of the forward clutch 34 and the brake oil chamber 45a of the reverse brake 43 of the forward/reverse change-over mechanism 11. The clutch pressure of the clutch pressure passage 58 is adjusted from the source pressure or the drain pressure of the secondary pressure adjust valve 51 by a clutch pressure adjust valve 57. Specifically, the oil pressure in the clutch pressure passage 58 is set to a low pressure, when the external pilot pressure is fed to the clutch pressure adjust valve 57, and is set to a higher pressure than the fed level when the feed of the external pilot pressure is stopped.

To the drain port of the clutch pressure adjust valve 57, there is connected a lubrication pressure passage 55, which is connected to the lubricated portion of the forward/reverse change-over mechanism 11, the lubricated portion of the drive belt 17 and the balance chamber of the secondary shaft and further to the lockup release chamber 9b. The lubrication pressure of the lubrication pressure passage 55 is adjusted by a lubrication pressure adjust valve 54 from the source pressure of the drain pressure of the clutch pressure adjust valve 57. To the drain port of the clutch pressure adjust valve 57, there is connected a drain oil passage 56, which is connected to the intake port of the oil pump 47.

There are provided: an apply pressure passage 61 which is connected to the apply chamber 9a of the torque converter 2; a release pressure chamber 62 which is connected to the release chamber 9b; a brake change-over pressure passage 63 which is connected to the brake oil chamber 45a for applying the reverse brake 43; a clutch change-over pressure passage 64 which is connected to the clutch oil chamber 32a for actuating the forward clutch 34; and a switch valve 65 for controlling the connection between the aforementioned lubrication pressure passage 55 and clutch pressure passage 58.

This switch valve 65 has four portions each of a three-pot change-over valve structure and takes two positions: a released position of the lockup clutch 9 in the F&R mode, in which the external pilot pressure is not applied, as shown in FIG. 2, that is, in which the vehicle speed is at a predetermined value or lower; and an applied position of the lockup clutch 9 in the state in which the external pilot pressure is applied.

In the released position, the lubrication pressure passage 55 and the release pressure passage 62 are brought into the communicating state by the switch valve 65, so that a cooler passage 67 provided with an oil cooler 66 and the apply pressure passage 61 come into the communicating state. As a result, the hydraulic circuit comes into the F&R mode, i.e., the mode in which the torque converter 2 can act to control the oil pressure of the forward/reverse change-over mechanism 11. At this time, the working oil, as set to the lubrication pressure, is fed to the release chamber 9b and is discharged from the apply chamber 9a and returned through the oil cooler 66 to the oil pan.

In the applied position, on the other hand, the clutch pressure passage 58 and the apply pressure passage 61 come into the communicating state so that the working oil, as set to the clutch pressure, is fed to the apply chamber 9a. At this time, a slip pressure passage 68, as connected to the clutch pressure passage 58, is made to communicate with release pressure passage 62. The slip pressure passage 68 is provided with a slip pressure adjust valve 71, which controls the slip pressure, as fed to the slip pressure passage 68 in accordance with the external pilot pressure fed to the external pilot chamber of the slip pressure adjust valve 71, to an arbitrary pressure within a range from the same pressure as the clutch pressure to the pressure 0. Therefore, the lockup clutch 9 is applied to the lockup mode, when the slip pressure becomes 0, and is released when the slip pressure becomes equal to the clutch pressure. By controlling the slip pressure suitably, moreover, it is possible to make the slip control of the lockup clutch 9, in which the rotational difference of the lockup clutch 9 is control to a constant. When the switch valve 65 comes to the applied position, the lubrication pressure passage 55 communicates with the cooler passage 67 through the switch valve 65 so that the working oil is cooled by the oil cooler 66.

In order to feed the slip pressure adjust valve 71 with the external pilot pressure, there is connected between the pilot port of the slip pressure adjust valve 71 and the clutch pressure passage 58 a pilot pressure passage 72, which is provided with a pilot pressure adjust valve 73 for controlling the pilot pressure.

To a select lever 74 or a control lever disposed in the vehicle compartment for switching the running modes, there are linked a manual valve 75 and a reverse signal valve 76 which are individually associated the select lever 74. These valves 75 and 76 are actuated to five positions corresponding to a v (Parking) range, an R (Reverse) range, an N (Neutral) range. a D (Drive) range, and a Ds (Sporty Drive) range, as set by the select lever 74.

A pilot pressure passage 77 for causing the clutch pressure passage 58 to communicate with the external pilot chamber of the switch valve 65 through the reverse signal valve 76 is provided with a three-port type solenoid change-over valve 78. The switch valve 65 is brought to the lockup control position, in which the lockup clutch is applied, when a solenoid 78a of the change-over valve 78 is turned ON, but to the F&R position, as shown in FIG. 2, when the solenoid 78a is turned OFF. The pilot pressure passage 77 is connected to the external pilot chamber of the clutch pressure adjust valve 57, as indicated by a broken line, so that the clutch pressure is fed to the external pilot chamber of the clutch pressure adjust valve 57 and set to the low pressure when the reverse signal valve 76 is set to any of the N-position, the D-position and the Ds-position. When the reverse signal valve 76 is set to the remaining position such as the P-position or the R-position, on the other hand, the external pilot chamber of the clutch pressure adjust valve 57 is not fed with the oil pressure so that the clutch pressure is set to a higher pressure than the aforementioned one.

Between the switch valve 65 and the manual valve 75, there is interposed a common change-over pressure passage 79, which has communication with the slip pressure passage 68, when the switch valve 65 takes the F&R position, and with the clutch pressure passage 58 when the switch valve 65 takes the lockup control position. The change-over pressure passage 79 has communication with the clutch change-over pressure passage 64 through the manual valve 75, when the manual valve 75 is set to either the D-range or the Ds-range by the operation of the select lever 74, and with the brake change-over pressure passage 63 when the same is set to the R-range.

In the upstream portion of the clutch pressure passage 58 connected to the drain port of the secondary pressure adjust valve 51, as shown in FIG. 2, there is disposed an oil filter or a filter 81, through which the working oil is passed and is adjusted by the clutch pressure adjust valve 57 to set the clutch pressure. This clutch pressure is further adjusted by the lubrication pressure adjust valve 54 to set the lubrication pressure. Therefore, the working oil, as discharged from the drain port of the secondary pressure adjust valve 51, is fed to the individual valves, oil chambers, bearings and sliding portions composing the hydraulic circuit of the CVT. As a result, the working oil to be fed to those portions can be cleared in advance of the detrimental foreign substances or contaminants thereby to keep the control performance of the CVT, to prevent the deterioration of the functions and to keep and improve the reliability and durability of the individual sliding portions.

Thus, the working oil to return to the oil pan 48 through the oil cooler 66 and the working oil to flow from the drain oil passage 56 into the intake portion of the oil pump 47 never fail to pass through the filter 81. As a result, the working oil to circulate in the hydraulic circuit can be kept clean, and the cleanness of the working oil to return to the oil pan 48 can be improved to reduce the frequency of or to eliminate the oil exchange. On the other hand, the foreign substance in the working oil in the line pressure passage 50 on the upstream side of the filter 81 can be reduced to keep the performance of the speed change control and to prevent the deterioration of the functions.

The capacity of the oil pump 47 to be driven by the engine is so set as to retain a sufficient feed of the working oil for the capacity change in the oil chamber to vary the pulley groove width. When the pulley is not performing the speed change action, therefore, the discharge of the pump exceeds the amount of oil necessary for the CVT so that much working oil is excessively drained from the drain port of the secondary pressure adjust valve 51, but this working oil never fails to pass through the filter 81 for the filtrations. On the other hand, the working oil to be returned from the drain oil passage 56 is returned to the intake portion of the oil pump 47 but not directly into the oil pan 48. As a result, the amount of the working oil to flow directly into the oil pan 48 can be reduced so that the oil deterioration due to the agitation or the oil deterioration, as might otherwise be caused by the migration of air into the oil having lubricated and having been cooled, can be prevented to retain the keep of the speed change control performance.

As shown in FIG. 2, the clutch pressure passage 58 is provided with a bypass oil passage 82 for connecting the upstream side and the downstream side of the filter 81. In the bypass oil passage 82, there is disposed a one-way valve or a check valve 83 for guiding the oil pressure on the upstream side of the filter 81 to the downstream side, when it exceeds the oil pressure on the downstream side by a predetermined value or higher, thereby to block the backward flow.

As a result, the working oil flows through the bypass oil passage 82, when the flow resistance of the filter 81 rises to raise the differential pressure across it to a predetermined value or higher as exemplified by the case in which the working oil has a high viscosity at a low temperature or in which the filter 81 is clogged. However, the bypass oil passage 82 may be dispensed with.

Figure 3:
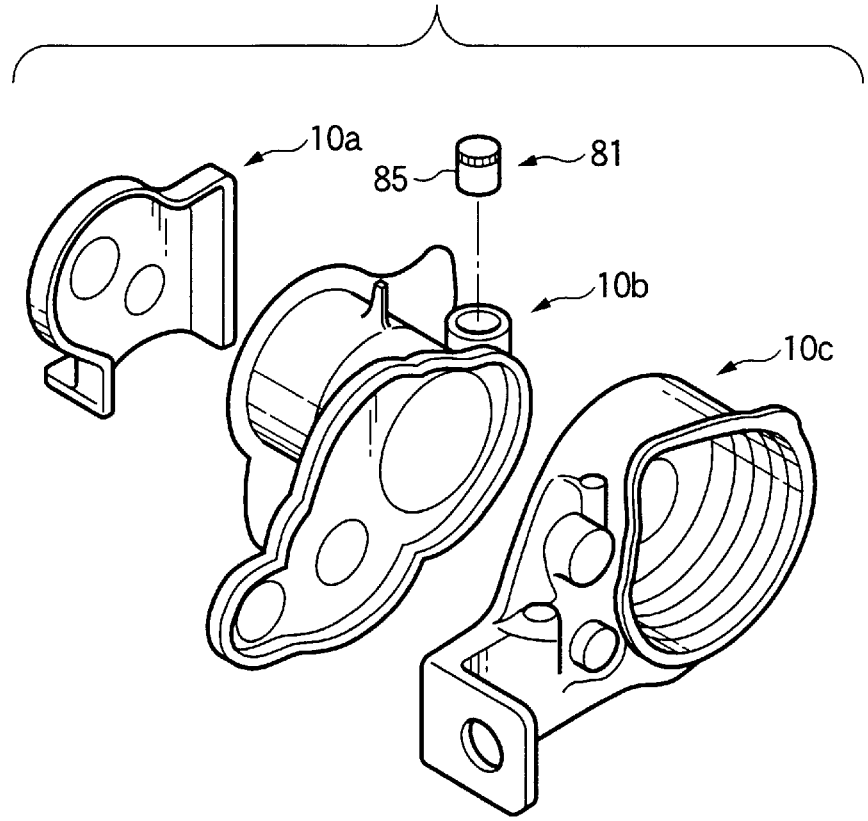
FIG. 3 is an exploded perspective view showing a casing for accommodating the continuously variable transmission.

FIG. 3 is a schematic diagram showing the casing 10 for covering the member constructing the CVT shown in FIG. 1. The casing 10 includes: a first casing 10a or a side casing for accommodating that portion of the continuously variable transmission 12 that has the primary pulley 14 and the secondary pulley 16; a second casing 10b or a transmission casing for accommodating the portion of the forward/reverse change-over mechanism 11; and a third casing 10c or a converter casing for accommodating the torque converter 2. These casings 10a to 10c are jointed by means of bolts, and the filter 81 is removably mounted on the second casing 10b.

Figure 4:
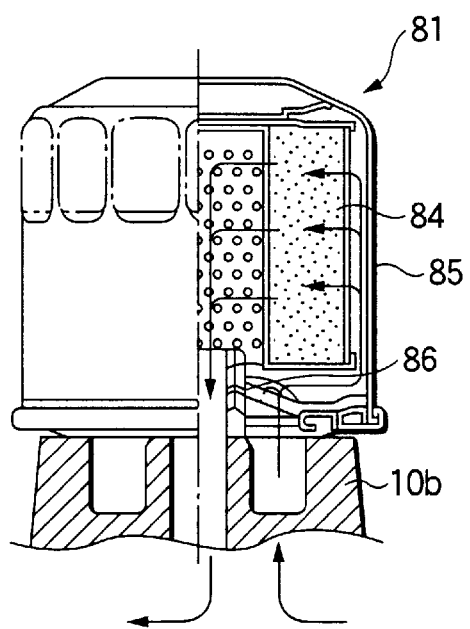
FIG. 4 is a half sectional view showing one example of a filter.

FIG. 4 is a half sectional view showing one example of the filter 81. This filter 81 includes a cylindrical filter element 84 and a filter casing 85 for accommodating the filter element 84. The filter casing 85 is fastened in a threaded portion 86 which is formed in the second casing 10b. By removing the filter casing 85 from the second casing 10b, therefore, the filter element 84 or the entire filter 81 can be easily replaced.

Each filter 81 is set to have a sufficient filtration area considering the constant run at the time when the gear ratio is on a high speed side, because the working oil from the oil pump 47 substantially passes through the filter 81 in that running state. The filter 81 of the external type, as shown in FIG. 4, is effective when the clutch pressure is relatively low, but the filter 81 of the buried type, as shown in the described later, is effective when the clutch pressure is relatively high.

According to this embodiment of the invention, the drain oil pressure of the secondary pressure adjust valve is fed the hydraulic device such as the clutch oil chamber of the forward/reverse change-over mechanism, and the oil filter is disposed on the most upstream side of the drain pressure passage so that all the working oil to be fed to the hydraulic device can be concentratedly filtered by the one filter thereby to take advantages in the manufacture and maintenance of the automobile.

The concentration of the filter raises the degrees of freedom for setting the performance, the arranging position and the size of the filter.

The control characteristics of the valve for the pressure adjustments can be kept to prevent the occurrence of the valve stick.

The return oil to the intake port of the oil pump or the lie pressure passage can be cleared of the foreign substances to prevent the deterioration in the control characteristics of the valve for adjusting the pulley groove width.

The oil to be fed for lubricating or cooling operations through the line pressure passage or the lubrication pressure passage can be filtered out by the filter to improve the durability and reliability in the bearings and the sliding portions.

The oil can be prevented from the deterioration to reduce the frequency of or to eliminate the oil exchange.

The filter can be replaced without disassembling the transmission casing to facilitate its replacement.

When the pressure on the upstream side of the filter is higher than that on the downstream side by a predetermined value, the oil circulates via the bypass oil passage so that the oil can be reliably circulated even if the filter is blinded.

Next, a second embodiment of the invention will be described in detail with reference to the accompanying drawings.

The second embodiment of the invention is basically identical to the first embodiment of the invention in construction. Thus, only different features will be described below. In the following description of the second embodiment, like reference numerals are imparted to like members or members having like functions to those described in the first embodiment of the invention previously, and therefore, the detailed description thereof will be omitted.

Figure 5:
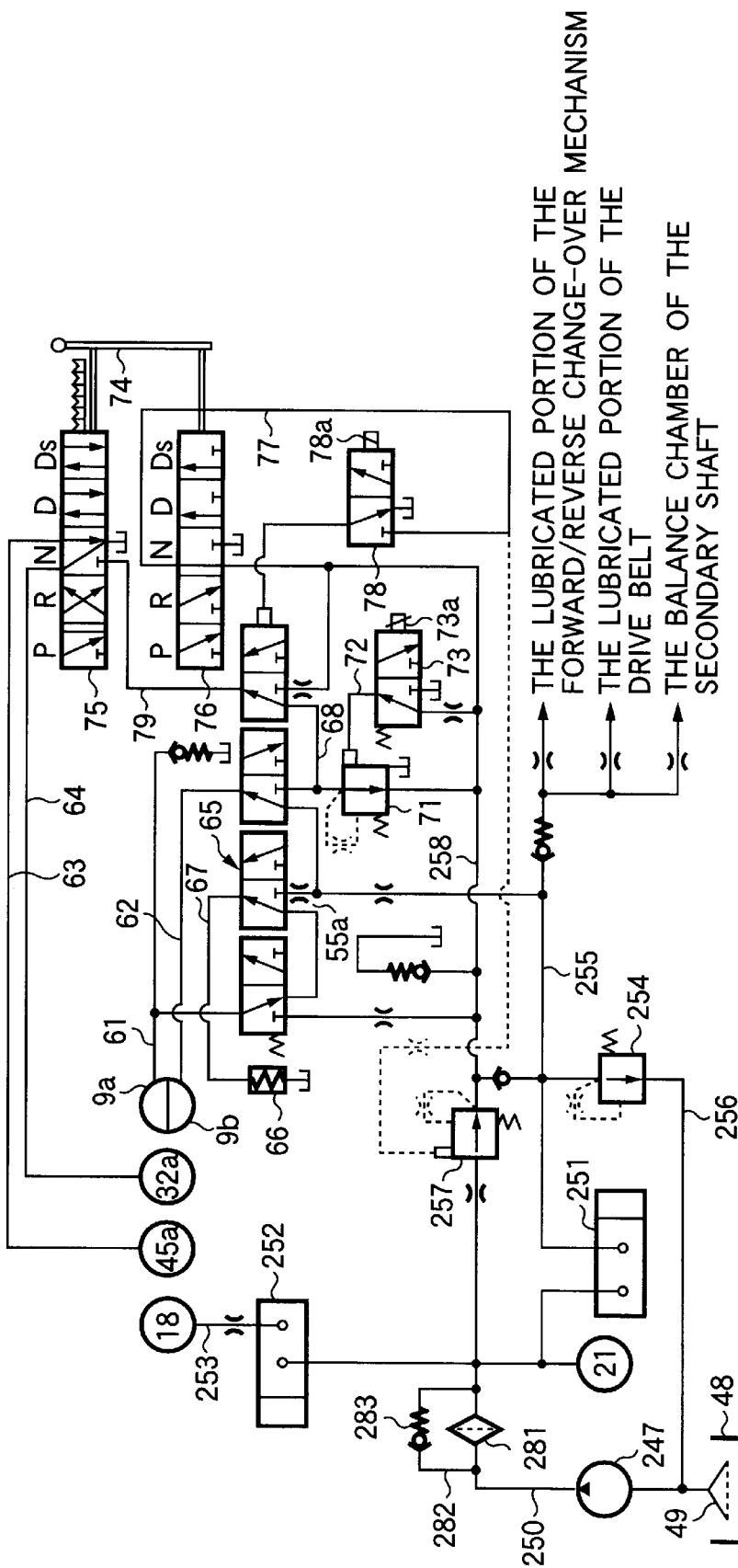
FIG. 5 is a circuit diagram showing a hydraulic circuit of the continuously variable transmission having a filter device according to a second embodiment of the invention.

FIG. 5 is a circuit diagram showing the hydraulic circuit of the CVT of this embodiment.

The discharge port of the oil pump 47 is connected via a secondary pressure passage or a line pressure passage 50 with not only the secondary oil chamber 21 for actuating the movable pulley 16b of the secondary pulley 16 but also a secondary pressure port of a secondary pressure adjust valve 251. By this secondary pressure adjust valve 251, the secondary pressure to be fed to the secondary oil chamber 21 is adjusted to a predetermined pressure so that it is controlled to a value matching the transmission capacity necessary for the drive belt 17. Specifically, the secondary pressure is raised to prevent the slippage of the drive belt 17, when the engine output is high for an uphill or abrupt acceleration, but is lowered to reduce the loss of the oil pump 47 and improve the transmission efficiency when the engine output is low.

The line pressure passage 250 is connected with the input port 252 of a primary pressure adjust valve 252, the output port of which is connected via a primary pressure passage 253 to the primary oil chamber 18 for actuating the movable pulley 14b of the primary pulley 14. By the primary pressure adjust valve 252, the primary pressure is adjusted to a value according to the target gear ratio or speed ratio so that the groove width of the primary pulley 14 is varied to control the vehicle speed.

The line pressure passage 250 is connected to the input port of a clutch pressure adjust valve 257, and a clutch pressure passage 258 is connected to the output port of the same. Via this clutch pressure passage 258, the working oil is fed to the clutch oil chamber 32a of the forward clutch 34 and the brake oil chamber 45a of the reverse brake 43 of the-forward/reverse change-over mechanism 11. The oil pressure in the clutch pressure passage 258 is set to a low pressure, when the external pilot pressure is fed to the clutch pressure adjust valve 257, and is set to a higher pressure than the fed level when the feed of the external pilot pressure is stopped.

To the drain port of the secondary pressure adjust valve 251, there is connected a lubrication pressure passage 255, via which the working oil is fed to the lubricated portion of the forward/reverse change-over mechanism 11, the lubricated portion of the drive belt 17 and the balance chamber of the secondary shaft and further to the lockup release chamber 9b. The lubrication pressure of the lubrication pressure passage 255 is adjusted by a lubrication pressure adjust valve 254 from the source pressure of the drain pressure of the secondary pressure adjust valve 251. The drain port of the lubrication pressure adjust valve 254 is connected to the intake port of the oil pump 47 via a drain oil passage 256.

As shown in FIG. 5, the line pressure passage 250 is provided with a filter 281, through which the working oil discharged from the oil pump 47 is wholly passed to remove the foreign substances. The working oil from the line pressure passage 250 is fed to the oil chamber for the groove width control, the clutch pressure passage 258 and the lubrication pressure passage 255. As a result, the working oil, as fed for lubricating and cooling all the valves or the individual portions such as the adjust valves, can be cleared in advance of the foreign substances and contaminants thereby to keep the control performance of the continuously variable transmission, to prevent the deterioration of the functions and to keep and improve the reliability and durability of the individual sliding portions.

Not only the working oil to return to the oil pan 48 through the oil cooler 66 but also the working oil to return via the drain oil passage 256 into the intake portion of the oil pump 47 never fails to be fed together with the working oil, as sucked through the oil strainer 49, to the individual portions through the oil filter 281. As a result, the working oil to circulate in the hydraulic circuit can be kept clean, and the cleanness of the working oil to return to the oil pan 48 can be improved to reduce the frequency of or to eliminate the oil exchange. In the prior art, moreover, the individual feed circuits to the valves are provided with the filters, some or all of which can be eliminated.

As shown in FIG. 5, the line pressure passage 250 is provided with a bypass oil passage 282 for connecting the upstream side and the downstream side of the filter 281. In the bypass oil passage 282, there is disposed a one-way valve or a check valve 283 for guiding the oil pressure on the upstream side of the filter 281 to the downstream side, when it exceeds the oil pressure on the downstream side by a predetermined value or higher, thereby to block the backward flow.

As a result, the working oil flows through the bypass oil passage 282, when the flow resistance of the filter 281 rises to raise the differential pressure across it to a predetermined value or higher as exemplified by the case in which the working oil has a high viscosity at a low temperature or in which the filter 281 is blinded. However, the bypass oil passage 282 may be dispensed with.

Figure 6:
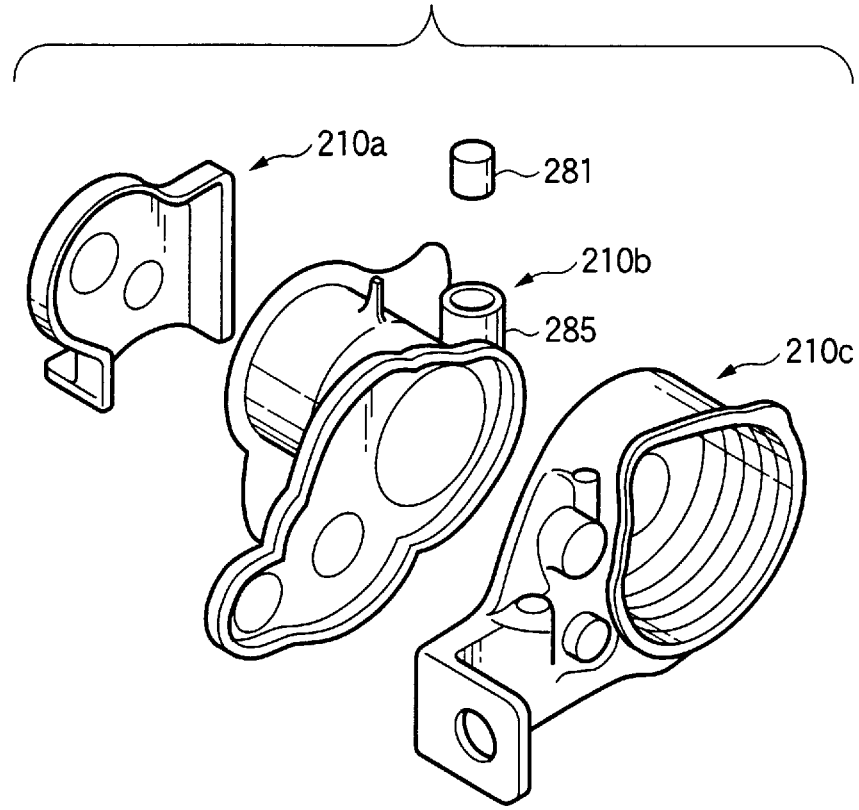
FIG. 6 is an exploded perspective view showing a casing for accommodating the continuously variable transmission.

FIG. 6 is a schematic diagram showing the casing 10 for covering the member constructing the CVT shown in FIG. 1. The casing 210 includes: a first casing 210a or a side casing for accommodating that portion of the continuously variable transmission 12 that has the primary pulley 14 and the secondary pulley 16; a second casing 210b or a transmission casing for accommodating the portion of the forward/reverse change-over mechanism 11; and a third casing 210c or a converter casing for accommodating the torque converter 2. These casings 210a to 210c are jointed by means of bolts, and the filter 281 is removably mounted on the second casing 210b.

Figure 7:
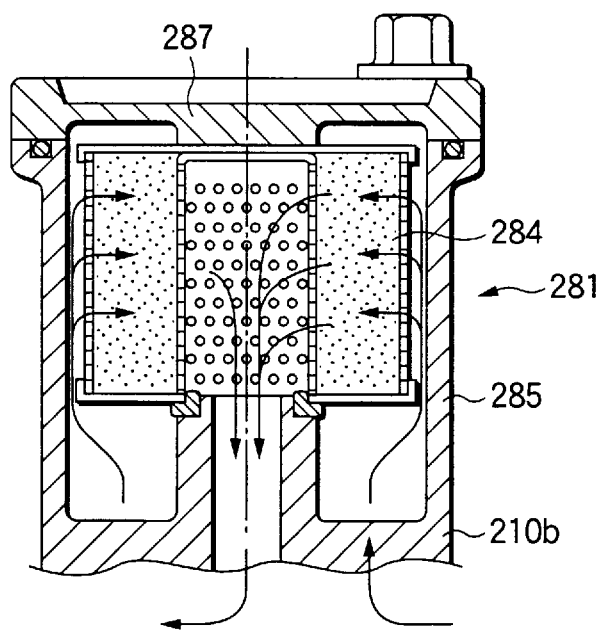
FIG. 7 is a half sectional view showing one example of a filter.

FIG. 7 is a sectional view showing another example of the filter 281. This filter 281 is constructed by using a portion of the second casing 210b as the filter casing 285 and by assembling the filter element 284 in the filter casing. The filter element 284 is covered with a cover 287 so that it can be replaced by removing the cover 287.

The working oil to flow in the line pressure passage 250 has a high pressure for controlling the groove width of the pulley, but the filter casing 285 is formed integrally with the transmission casing so that it can endure the high level of the line pressure. The filter element 284 can be easily replaced by removing the cover 287.

The lubrication oil of the engine other than the CVT is filtered by providing the oil strainer on the intake port side of the pump and the cartridge type filter on the discharge side, so that the cleaned working oil is fed to the individual portions. In the case of the CVT, the discharge pressure of the oil pump is so high that the occurrence of liquid leakage cannot be avoided for the cartridge type filter. However, this liquid leakage can be reliably prevented by the buried type filter, as shown in FIG. 7.

By the way, such the structure of the filter 281 as shown in this embodiment may be applied to one of the first embodiment.

According to the second embodiment of the invention, the oil filter is arranged at the discharge portion of the oil pump so that the discharge oil is wholly cleaned, and the working oil to be fed to the line pressure passage can be cleared of the foreign substances or contaminants to prevent the reduction in the controllability of each pressure adjust valve for varying the pulley groove width.

The foreign substances and so on in the working oil to be fed to the clutch pressure passage are removed by the oil filter so that the control characteristics of the solenoid and the adjust valve in the clutch pressure passage can be kept to prevent the valves from being stuck.

The foreign substances in the working oil to be fed to the lubrication oil passage are removed by the oil filter so that the durability and reliability of the sliding portions to be fed from the lubrication pressure passage for the lubrication and cooling operations are improved.

The working oil to return to the oil pan is cleared of the foreign substances so that its oil characteristics can be prevented from the deterioration, to reduce the frequency of or to eliminate the oil exchange.

The filter can be replaced without disassembling the transmission casing to facilitate its replacement.

By providing the line pressure passage with the bypass oil passage connecting the upstream side and the downstream side of the filter, the working oil can be reliably circulated even if the flow resistance of the filter is increased at a low temperature or due to the blinding of the filter.

Further, a third embodiment of the invention will be described in detail with reference to the accompanying drawings.

The third embodiment of the invention is basically identical to the first embodiment of the invention in construction. Thus, only different features will be described below. In the following description of the second embodiment, like reference numerals are imparted to like members or members having like functions to those described in the first embodiment of the invention previously, and therefore, the detailed description thereof will be omitted.

Figure 8:
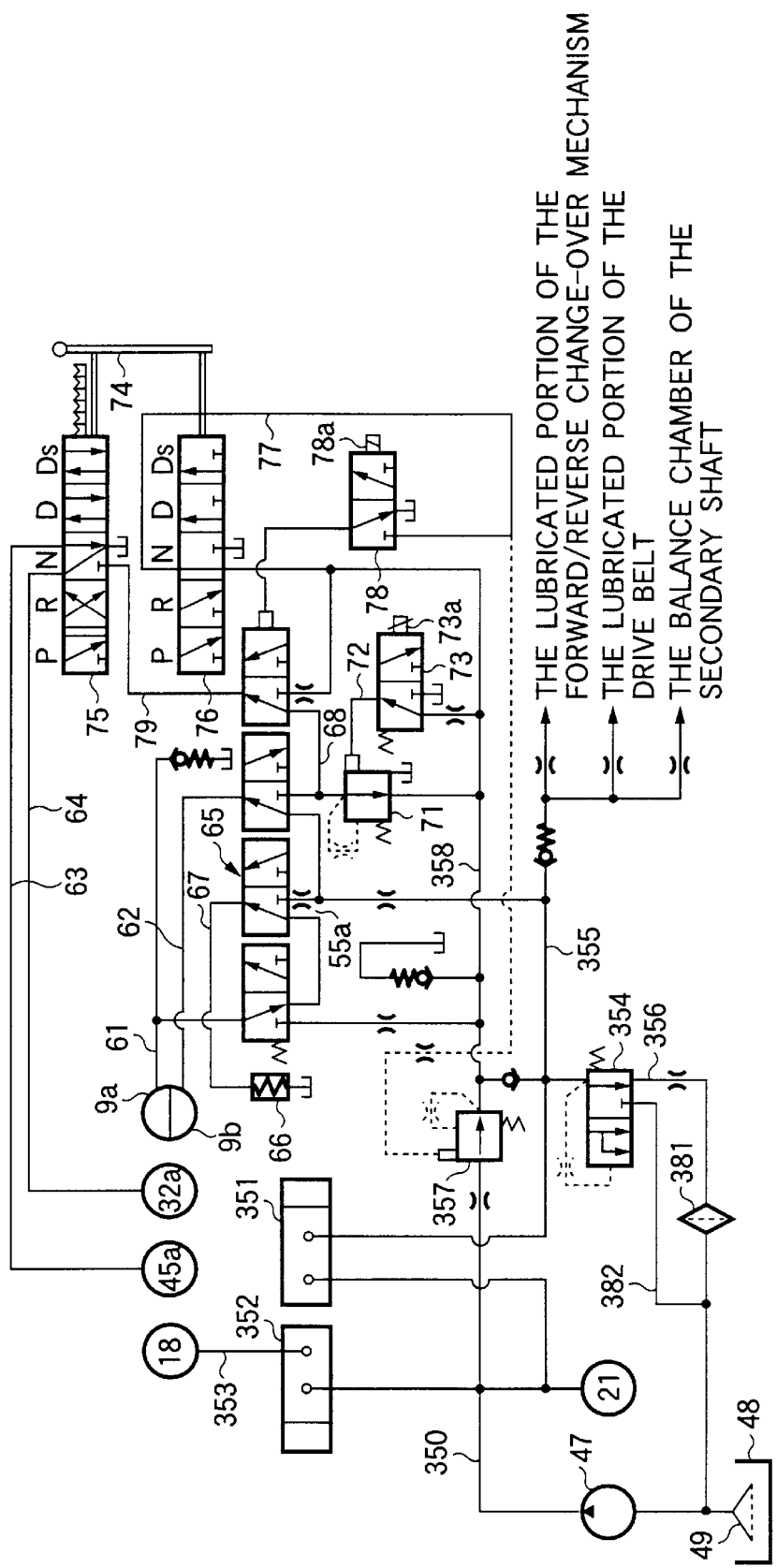
FIG. 8 is a circuit diagram showing a hydraulic circuit of the continuously variable transmission having a filter device according to a third embodiment of the invention.

FIG. 8 is a circuit diagram showing the hydraulic circuit of the CVT of this embodiment. The line pressure passage 350 is connected to the input port of a clutch pressure adjust valve 357, and a clutch pressure passage 358 is connected to the output port of the same. Via this clutch pressure passage 358, the working oil is fed to the clutch oil chamber 32*a* of the forward clutch 34 and the brake oil chamber 45*a* of the reverse brake 43 of the forward/reverse change-over mechanism 11. The oil pressure in the clutch pressure passage 358 is set to a low pressure, when the external pilot pressure is fed to the clutch pressure adjust valve 357, and is set to a higher pressure than the fed level when the feed of the external pilot pressure is stopped.

To the drain port of the secondary pressure adjust valve 351, there is connected a lubrication pressure passage 355, via which the working oil is fed to the lubricated portion of the forward/reverse change-over mechanism 11, the lubricated portion of the drive belt 17 and the balance chamber of the secondary shaft and further to the lockup release chamber 9*b*. The lubrication pressure of the lubrication pressure passage 355 is adjusted by a lubrication pressure adjust valve 354 from the source pressure of the drain pressure of the secondary pressure adjust valve 351. The drain port of the lubrication pressure adjust valve 354 is connected to the intake port of the oil pump 47 via a drain oil passage 356.

As shown in FIG. 8, the drain oil passage 356 is provided with a filter 381, through which the working oil to flow out from the drain port of the lubrication pressure adjust valve 354 is cleared of the foreign substances. This lubrication pressure adjust valve 354 is provided with a bypass port communicating with a bypass oil passage 382, which communicates with the lubrication pressure passage 355 when the oil to be fed to the filter 381 increases to a predetermined amount or higher. The bypass oil passage 382 is connected to the downstream side of the filter 381.

Where the oil amount becomes that at the engine speed exceeding the higher engine speed in the ordinary run, e.g., about 3,500 to 4,000 rpm, therefore, the working oil of the lubrication pressure passage 355 returns to the intake port of the oil pump 47 from both the drain oil passage 356 and the bypass oil passage 382.

It is the present state that the amount of oil discharged from the oil pump 47 driven by the engine always fluctuates under the running conditions so that it does not take the maximum at all times. In the ordinary running state, therefore, the working oil never fails to be filtered out via the drain oil passage 356 by the filter 381 so that the filter 381 arranged in the drain oil passage 356 can be relatively small-sized by returning the working oil via the bypass oil passage 382 only when the engine speed rises to the higher side to augment the amount of lubrication oil.

By thus using the relatively small-sized filter 381, too, far more working oil in the drain oil passage 356 than that to be fed to the oil cooler 66 can be filtered to keep clean the working oil to flow out from the drain port of the secondary pressure adjust valve 351. As a result, it is possible to keep the control performance and achieve the prevention of the function drop of the continuously variable transmission thereby to keep and improve the reliability and the durability of the individual sliding portions. The cleanness of the working oil to return to the oil pan 48 can be improved to reduce the frequency of or eliminate the oil exchange.

Figure 9A:
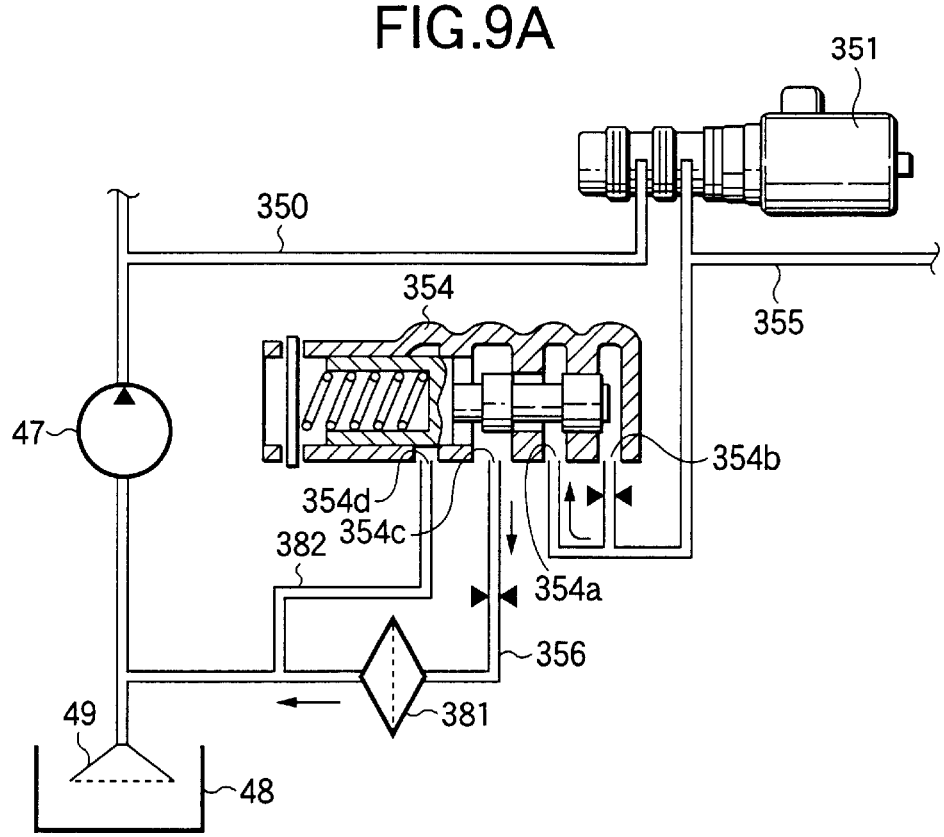
FIGS. 9A and 9B are sectional diagrams showing a lubrication pressure adjust valve shown in FIG. 8.
Figure 9B:
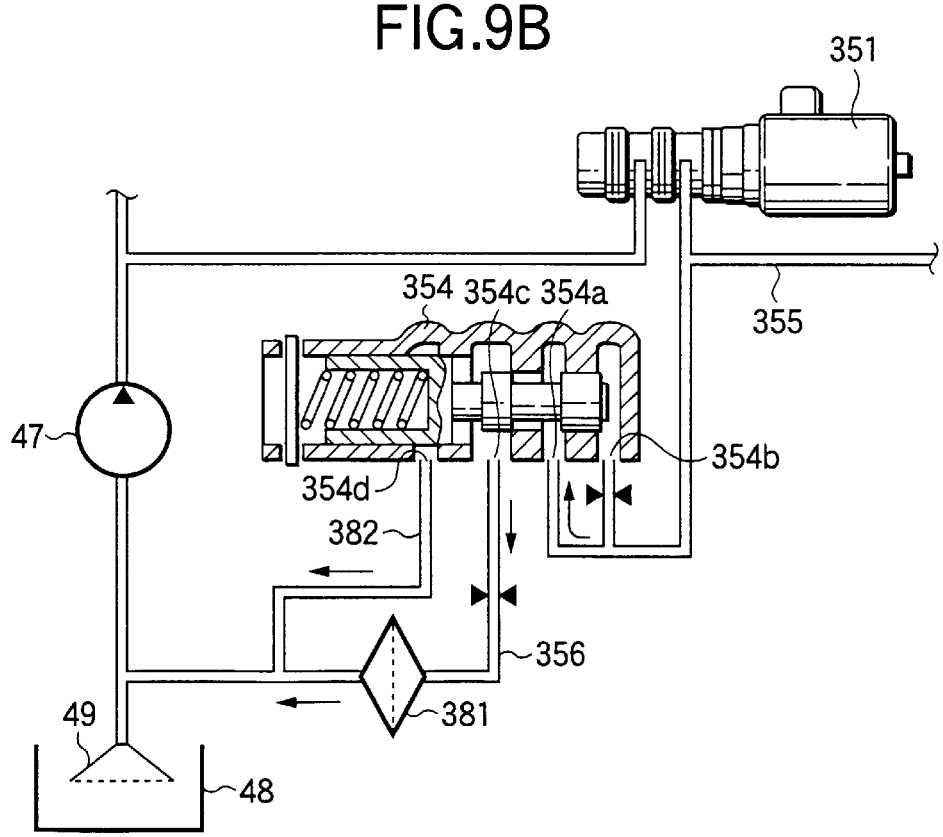

FIG. 9A and 9B are sectional diagrams showing a specific structure of the lubrication pressure adjust valve 354 of this embodiment. This lubrication pressure adjust valve 354 is provided with: an input port 354*a* and a pilot port 354*b*, to which the lubrication pressure passage 355 is connected; a drain port 354*c*, to which the drain oil passage 356 is connected; and a bypass port 354*d* to which the bypass oil passage 382 is connected. When the oil amount in the lubrication pressure passage 355 is at a predetermined value or lower, therefore, the input port 354*a* communicates with the drain port 354*c*, as shown in FIG. 9A, so that the working oil returns wholly via the drain oil passage 356 to the oil pump 47. When the engine speed rises to the higher speed side, on the other hand, the input port 354*a* communicates with the bypass port 354*d*, too, as shown in FIG. 9B, so that the working oil returns via the two oil passages.

Figure 10:
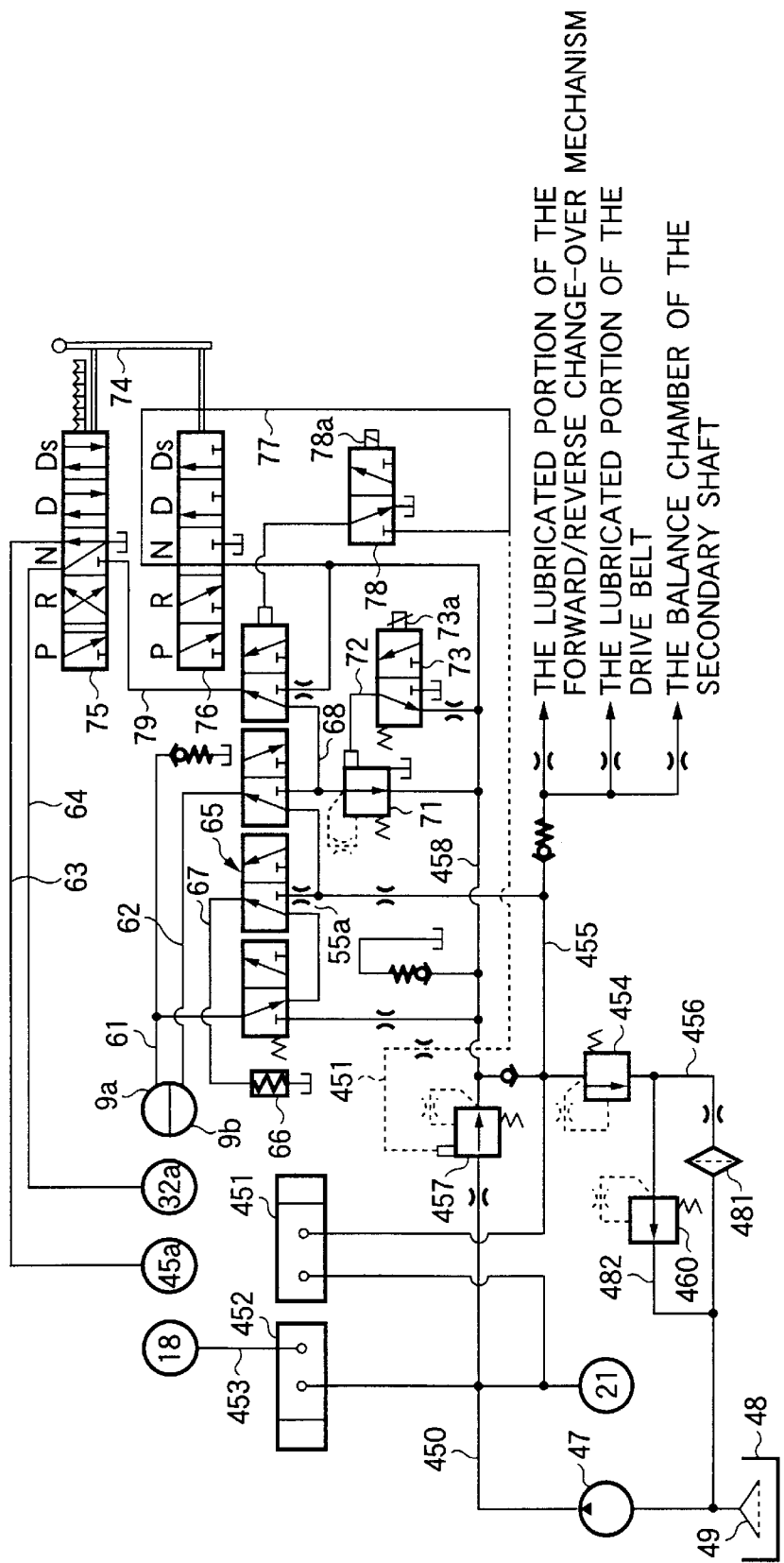
FIG. 10 is a circuit diagram showing a hydraulic circuit of the continuously variable transmission having a filter device according another aspect of the third embodiment of the invention.

FIG. 10 is a circuit diagram showing a hydraulic circuit according to another aspect of the third embodiment of the invention and similar to FIG. 8, and the parts common to those shown in FIG. 8 are designated by the identical reference numerals. In this embodiment, the bypass passage 482, as attached to the drain oil passage 456 to provide the communication between the upstream side and the downstream side of the filter 481, is provided with a drain pressure adjust valve 460 for opening the bypass oil passage 482 when the amount of the working oil to be fed to the filter 481 increases.

Figure 11A:
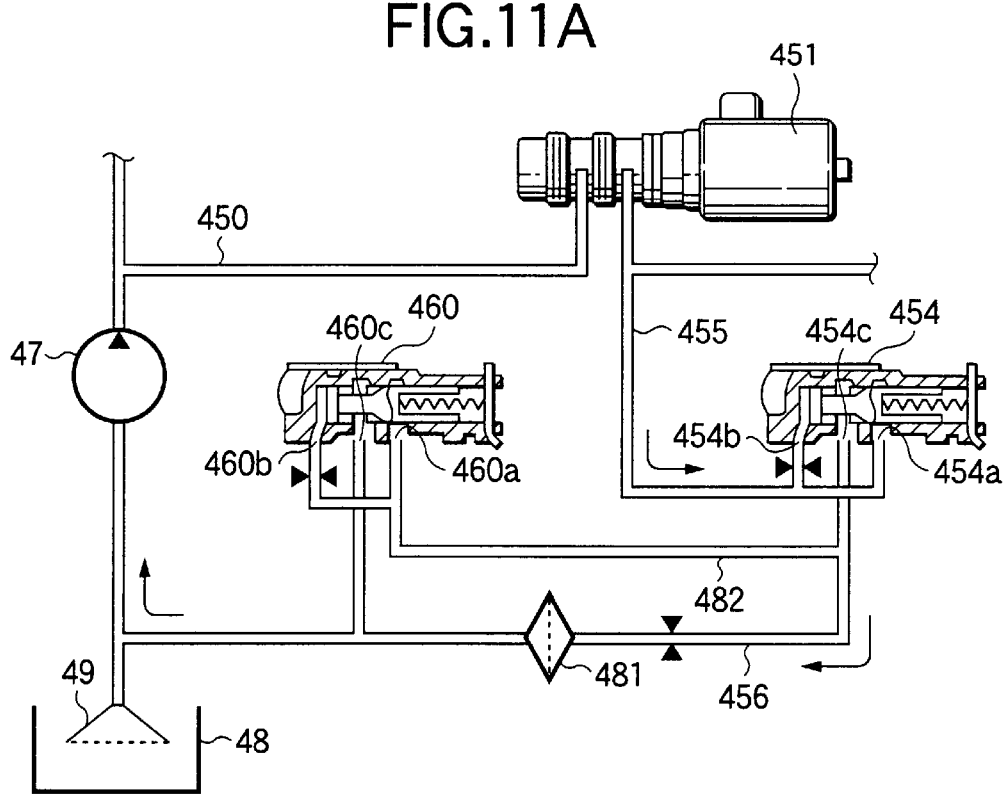
FIGS. 11A and 11B are sectional diagrams showing a lubrication pressure adjust valve and a drain pressure adjust valve shown in FIG. 10.
Figure 11B:
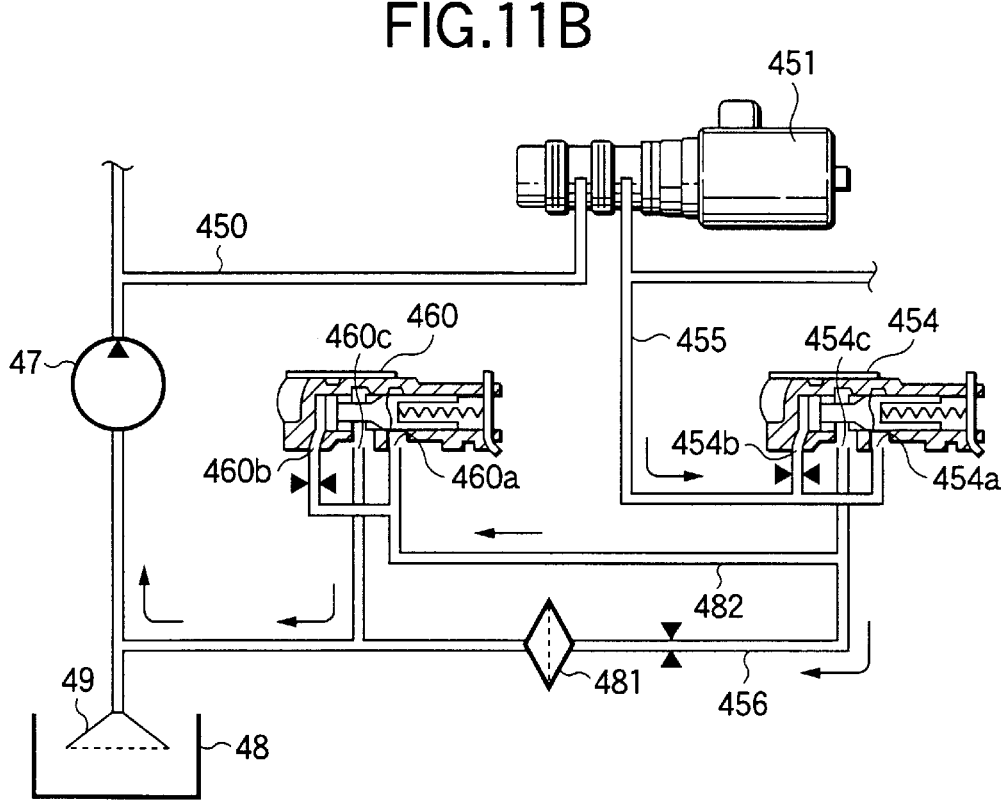

FIGS. 11A and 11B are sectional diagrams showing specific structures of the lubrication pressure adjust valve 454 and the drain pressure adjust valve 460. The lubrication pressure adjust valve 454 is provided with: the input port 454a and the pilot port 454b, to which the lubrication pressure passage 455 is connected; and the drain port 454c to which the drain oil passage 456 is connected. The drain pressure adjust valve 460 has a basic structure substantially similar to that of the lubrication pressure adjust valve 454 and is provided with: an input port 460a and a pilot port 460b, to which the upstream side of the bypass oil passage 482 is connected; and a drain port 460c to which the downstream side is connected. The pressures to be established by the individual adjust valves 454 and 460 are adjusted by the spring forces of coil springs, as applied to their spools.

In the case shown in FIGS. 10, 11A and 11B, there are used the two valves of the lubrication pressure adjust valve 454 and the drain pressure adjust valve 460. In the case shown in FIGS. 8, 9A and 9B, however, the functions of the two adjust valves are performed by the one lubrication pressure adjust valve 454 so that the device can be small-sized.

In this embodiment, the casing for covering the member constructing the CVT and the filter may be identical to ones of the first embodiment or the second embodiment of the invention.

Since the working oil to be returned to the intake port of the oil pump is cleared of the foreign substances or contaminants by the filter, according to the invention, the foreign substances, as discharged from the oil pump and fed to the line pressure passage, can be filtered out to prevent the reduction in the controllability of the primary pressure adjust valve and the secondary pressure adjust valve for adjusting the pulley groove widths.

Since the working oil to be fed from the line pressure passage to the clutch pressure passage can be cleared of the foreign substances, the control characteristics of the pressure adjust valve and the solenoid, as disposed in the clutch pressure passage, can be kept to prevent the valves from being stuck.

Since the working oil to be fed to the lubrication pressure passage can be cleared of the foreign substances, it is possible to improve the durability and reliability of the sliding portions to be fed with the working oil for the lubricating and cooling operations.

The working oil to return to the oil pan can be prevented from the deterioration to reduce the frequency of or to eliminate the oil exchange.

The filter can be replaced without disassembling the transmission to facilitate its replacement.

When the amount of oil to be fed to the filter increases, the working oil is returned, while bypassing the filter, to the intake port of the oil pump so that the oil filter can be small-sized and so that the lubrication pressure of the lubrication pressure passage can be kept constant to stabilize the lubrication characteristics.

Since the filter is disposed in the drain oil passage under a lower pressure, it is possible to enjoy high degrees of freedom for the space and the method for mounting the filter.

The invention should not be limited to the foregoing embodiments but could naturally be modified in various manners without departing from the gist thereof. On the drive system of the belt type continuously variable transmission, for example, the invention can be applied not only to the case shown in FIG. 1 but alto to various types such as a type not having the torque converter 2.

What is claimed is:

1. A working oil filter device for a continuously variable transmission including a primary pulley mounting on a primary shaft and having a variable pulley groove width; a secondary pulley mounted on a secondary shaft having a variable pulley groove width such that a belt is made to run between said primary pulley and said secondary pulley; a forward clutch for transmitting the output of an engine in a forward direction to said primary shaft; and a reverse brake for transmitting the same in a reverse direction to said primary shaft, the filter device comprising:

a secondary pressure adjust valve which adjusts and feeds the working oil to a secondary cylinder for varying the pulley groove width of said secondary pulley;

a clutch pressure adjust valve disposed in a clutch pressure passage connecting the drain port of said secondary pressure adjust valve, said forward clutch and said reverse brake, which adjusts a clutch pressure with setting the drain pressure of said secondary pressure adjust valve to an original pressure;

a lubrication pressure adjust valve disposed in a lubrication pressure passage connecting the drain port of said clutch pressure adjust valve and a lubricated portion, which adjusts a lubrication pressure with setting the drain pressure of said clutch pressure adjust valve to an original pressure; and a filter disposed on the upstream side of said clutch pressure passage.

2. The filter device according to claim 1, comprising: a check valve disposed in a bypass passage connecting the upstream side and the downstream side of said filter, which guides the working oil to the downstream side when the oil pressure on the upstream side is higher than that on the downstream side by a predetermined value or higher.

3. The filter device according to claim 1, wherein said filter is removably mounted on a casing covering a member constructing the continuously variable transmission.

4. A working oil filter device for a continuously variable transmission including: a primary pulley mounting on a primary shaft and having a variable pulley groove width; a secondary pulley mounted on a secondary shaft having a variable pulley groove width such that a belt is made to run between said primary pulley and said secondary pulley; a forward clutch for transmitting the output of an engine in a forward direction to said primary shaft; and a reverse brake for transmitting the same in a reverse direction to said primary shaft, the filter device comprising:

a primary pressure adjust valve which adjusts and feeds the working oil to a primary cylinder for varying the pulley groove width of said primary pulley;

a secondary pressure adjust valve which adjusts and feeds the working oil to a secondary cylinder for varying the pulley groove width of said secondary pulley; and a filter disposed in a line pressure passage which guides the discharge port of said oil pump, said primary pressure adjust valve and said secondary pressure adjust valve.

5. The filter device according to claim 4, comprising a check valve disposed in a bypass passage connecting the upstream side and the downstream side of said filter, which guides the working oil to the downstream side when the oil pressure on the upstream side is higher than that on the downstream side by a predetermined value or higher.

6. The filter device according to claim 4, wherein said filter includes: a filter casing formed integrally with a casing covering members constructing the continuously variable transmission; and a filter element mounted removably in said filter casing.

7. A working oil filter device for a continuously variable transmission including: a primary pulley mounting on a primary shaft and having a variable pulley groove width; a secondary pulley mounted on a secondary shaft having a variable pulley groove width such that a belt is made to run between said primary pulley and said secondary pulley; a forward clutch for transmitting the output of an engine in a forward direction to said primary shaft; and a reverse brake for transmitting the same in a reverse direction to said primary shaft, the filter device comprising:

a secondary pressure adjust valve which adjusts and feeds the working oil to a secondary cylinder for varying the pulley groove width of said secondary pulley;

a lubrication pressure adjust valve disposed in a lubrication pressure passage connecting the drain port of said secondary pressure adjust valve and a lubricated portion, which adjusts a lubrication pressure with setting the drain pressure of said secondary pressure adjust valve to an original pressure;

a filter disposed in a drain oil passage connecting the drain portion of said lubrication pressure adjust valve and the intake port of said oil pump; and a bypass passage which communicates between a bypass port disposed in said lubrication pressure adjust valve, said bypass port adapted to be opened corresponding to an increment of the amount of the working oil to be fed to said filter, and the downstream side of said filter.

8. A working oil filter device for a continuously variable transmission including: a primary pulley mounting on a primary shaft and having a variable pulley groove width; a secondary pulley mounted on a secondary shaft having a variable pulley groove width such that a belt is made to run between said primary pulley and said secondary pulley; a forward clutch for transmitting the output of an engine in a forward direction to said primary shaft; and a reverse brake for transmitting the same in a reverse direction to said primary shaft, the filter device comprising:

a secondary pressure adjust valve which adjusts and feeds the working oil to a secondary cylinder for varying the pulley groove width of said secondary pulley;

a lubrication pressure adjust valve disposed in a lubrication pressure passage connecting the drain port of said secondary pressure adjust valve and a lubricated portion for adjusting a lubrication pressure from an original pressure or the drain pressure of said secondary pressure adjust valve;

a filter disposed in a drain oil passage connecting the drain portion of said lubrication pressure adjust valve and the intake port of said oil pump; and a drain pressure adjust valve disposed in a bypass passage connecting the upstream side and the downstream side of said filter, which opens said bypass oil passage when the amount of the working oil fed to said filter increases.

9. The filter device according to claim 7, wherein said filter is removably mounted on a casing covering a member constructing the continuously variable transmission.

10. The filter device according to claim 8, wherein said filter is removably mounted on a casing covering a member constructing the continuously variable transmission.

* * * * *